(12) United States Patent
Hofmann et al.

(10) Patent No.: US 10,275,391 B2
(45) Date of Patent: Apr. 30, 2019

(54) COMBINING OF SEVERAL EXECUTION UNITS TO COMPUTE A SINGLE WIDE SCALAR RESULT

(71) Applicant: International Business Machines Corporation, Armonk, NY (US)

(72) Inventors: Nicol Hofmann, Leinfelden-Echterdingen (DE); Michael Klein, Schoenaich (DE); Cédric Lichtenau, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 15/412,429

(22) Filed: Jan. 23, 2017

(65) Prior Publication Data

US 2018/0210859 A1 Jul. 26, 2018

(51) Int. Cl.
*G06F 7/52* (2006.01)
*G06F 9/30* (2018.01)
*G06F 9/38* (2018.01)
*G06F 15/80* (2006.01)
*G06F 15/78* (2006.01)

(52) U.S. Cl.
CPC ............... *G06F 15/80* (2013.01); *G06F 7/52* (2013.01); *G06F 9/3001* (2013.01); *G06F 9/30014* (2013.01); *G06F 9/3887* (2013.01); *G06F 15/7867* (2013.01)

(58) Field of Classification Search
CPC .... G06F 9/3001; G06F 9/30014; G06F 15/80; G06F 9/3887; G06F 9/3889; G06F 9/3897
See application file for complete search history.

(56) References Cited

U.S. PATENT DOCUMENTS

| 4,612,628 | A | * | 9/1986 | Beauchamp | ............. G06F 7/48 708/507 |
| 7,062,526 | B1 | | 6/2006 | Hoyle | |
| 8,106,914 | B2 | | 1/2012 | Oberman et al. | |
| 8,725,990 | B1 | * | 5/2014 | Karandikar | ............. G06F 3/14 712/22 |
| 8,918,445 | B2 | | 12/2014 | Anderson et al. | |

(Continued)

FOREIGN PATENT DOCUMENTS

WO 2016105753 A1 6/2016

OTHER PUBLICATIONS

Akkas and Schulte, "A Quadruple Precision and Dual Double Precision Floating-Point Multiplier", 2003, IEEE. (Year: 2003).*

(Continued)

*Primary Examiner* — Benjamin P Geib
(74) *Attorney, Agent, or Firm* — Cantor Colburn LLP; Steven Chiu

(57) ABSTRACT

A circuit includes reconfigurable units that are reconfigurable to compute a combined result. A first intermediate result of a first reconfigurable unit of the reconfigurable units is exchanged with a second intermediate result of the second reconfigurable unit of the reconfigurable units. The first reconfigurable unit computes a first portion of the combined result utilizing the second intermediate result. The second reconfigurable unit of the reconfigurable units computes a second portion of the combined result utilizing the first intermediate result.

19 Claims, 5 Drawing Sheets

(56) References Cited

U.S. PATENT DOCUMENTS

| | | | |
|---|---|---|---|
| 9,189,200 B1* | 11/2015 | Langhammer | G06F 7/483 |
| 9,378,018 B2 | 6/2016 | Hansen et al. | |
| 10,007,487 B1* | 6/2018 | Czajkowski | G06F 5/012 |
| 2014/0059106 A1 | 2/2014 | Shinomiya et al. | |
| 2014/0089371 A1* | 3/2014 | Dupont De Dinechin | ................. G06F 7/483 708/503 |
| 2015/0019842 A1 | 1/2015 | Rahman et al. | |

OTHER PUBLICATIONS

International Search Report and Written Opinion; International Application No. PCT/IB2018/050102; International Filing Date: Jan. 8, 2018; dated May 4, 2018; 8 pages.

* cited by examiner

COMBINING OF SEVERAL EXECUTION UNITS TO COMPUTE A SINGLE WIDE SCALAR RESULT

BACKGROUND

The disclosure relates generally to a processor arithmetic design, and more specifically, to combining execution units to compute a single wide scalar result.

Contemporary chip/core designs are capable of processing new emerging workloads, like cognitive computing. However, these emerging workloads require massive computing power with varying requirements based on the problem attacked and the computation varies between massive short precision and high precision mathematics. The varying requirements provide difficulties for contemporary chip/core designs when building a "one size fits all" unit. These difficulties include striking a balance between a few high precision units that will not deliver the desired lower precision throughput and a sea of low precision units that will need software overhead to do complex high precision computation.

SUMMARY

According to one or more embodiments, a circuit is provided. The circuit comprises a plurality of reconfigurable units reconfigurable to compute a combined result. A first intermediate result of a first reconfigurable unit of the plurality of reconfigurable units is exchanged with a second intermediate result of a second reconfigurable unit of the plurality of reconfigurable units. The first reconfigurable unit of the plurality of reconfigurable units computes a first portion of the combined result utilizing the second intermediate result. The second reconfigurable unit of the plurality of reconfigurable units computes a second portion of the combined result utilizing the first intermediate result.

According to one or more embodiments, a system is provided. The system comprises a processor and a memory. The processor comprises a plurality of reconfigurable units reconfigurable to compute a combined result. A first intermediate result of a first reconfigurable unit of the plurality of reconfigurable units is exchanged with a second intermediate result of a second reconfigurable unit of the plurality of reconfigurable units. The first reconfigurable unit of the plurality of reconfigurable units computes a first portion of the combined result utilizing the second intermediate result. The second reconfigurable unit of the plurality of reconfigurable units computes a second portion of the combined result utilizing the first intermediate result.

According to one or more embodiments, a method is provided. The method is implemented by a processor comprising a plurality of reconfigurable units reconfigurable to compute a combined result. The method comprises exchanging a first intermediate result of a first reconfigurable unit of the plurality of reconfigurable units reconfigurable with a second intermediate result of a second reconfigurable unit exchange of the plurality of reconfigurable units reconfigurable. The method comprises computing, by the first reconfigurable unit of the plurality of reconfigurable units, a first portion of the combined result utilizing the second intermediate result; and computing, by the second reconfigurable unit of the plurality of reconfigurable units, a second portion of the combined result utilizing the first intermediate result.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In general, parallel computing is a type of computation in which many calculations and/or processes are carried out simultaneously to solve large problems. Examples of large problems include modeling the Milky Way galaxy, building and training cognitive computing models, implementing cancer research calculations, rendering three-dimensional aminations, etc. Parallel computing divides large problems into smaller calculations, which can then be solved at the same time. Based on the problem (and algorithm), low precision or high precision arithmetic or a mix of both is required. There are several different parallel computing forms (e.g., contemporary chip/core designs), each of which has drawbacks.

For instance, a contemporary system-on-a-chip big/little cores design that is used in a mobile device, where power is a premium over silicon area, is not affordable for high-end server chips where area is also in focus as chips cannot exceed a certain physical size. A contemporary high precision core chip, which can be interface with graphics processing units to provide sea of cores with lower precision arithmetic, also provides a large performance penalty with respect to the relative 'distance' (in cycles) and the bandwidth between these lower precision cores and the contemporary high precision core chip. Another approach for a high performance core chip, is to try to minimize the size of the high precision arithmetic unit on the core to fit as many cores as possible. This still does not fundamentally solve the problem of striking the balance between high precision and low precision arithmetic requirement.

Turning now to an overview of aspects of the present invention, embodiments disclosed herein may include a system, method, and/or computer program product (herein system) that combines single instruction, multiple data (SIMD) units to compute a single high precision complex arithmetic operation, by exchanging partial results between the SIMD units. SIMD units comprise multiple processing elements that can perform the same operation on multiple data points simultaneously. Technical effects and benefits of the system include enabling a build of high efficiency small lower precision blocks for a scale out market while still retaining the capacity to do high precision complex arithmetic (like high precision multiply-adds). Technical effects and benefits of the system include an ability to limit and hide any resulting wiring overhead and/or delay by pipelining the SIMD units. Thus, embodiments described herein are necessarily rooted in a processor of the system to perform proactive operations to overcome problems specifically arising in the realm of processor arithmetic design (e.g., these problems include balancing a few high precision units and a sea of low precision units in view of varying massive computing precision requirements).

Figure 1:
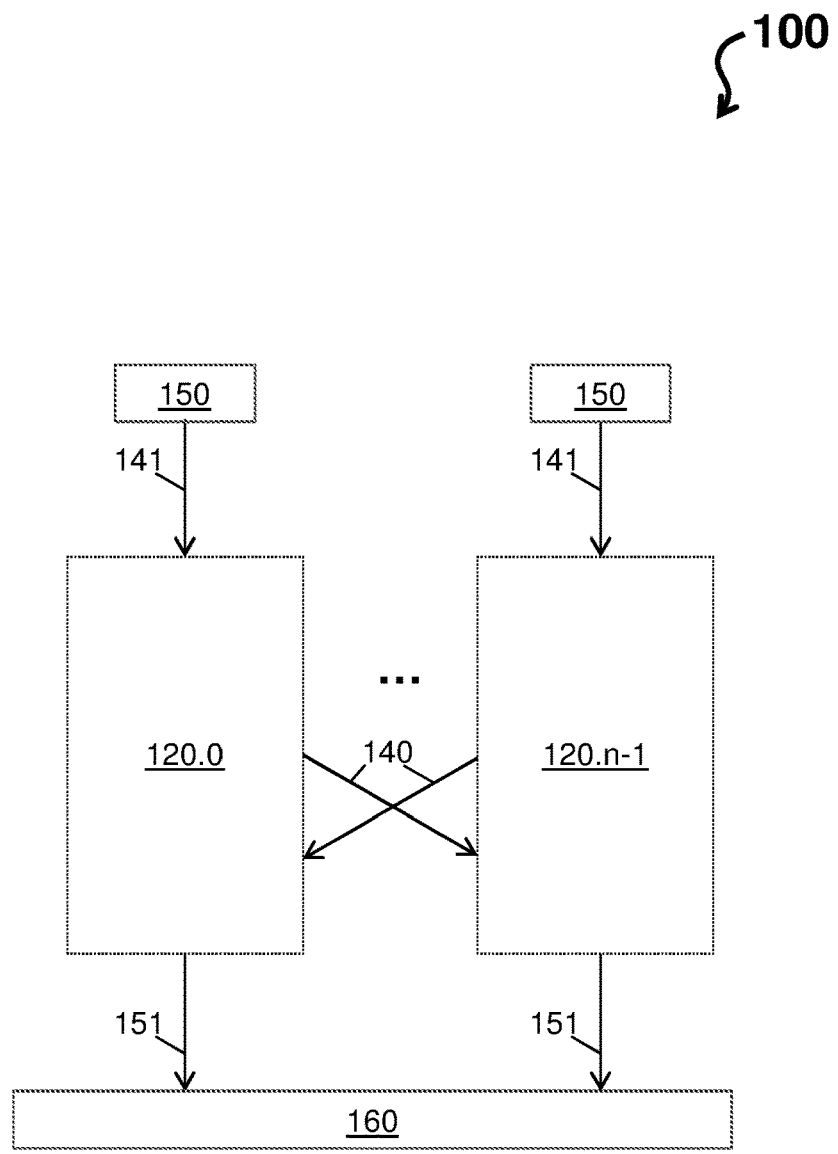
FIG. 1 depicts a system in accordance with one or more embodiments.

Turning now to FIG. 1, a system 100 combines n small lower precision x-bits units (SIMD units 120.0 ... 120.n–1, where n is an integer greater than zero) to compute a single high precision complex arithmetic operation (e.g., up to n*x-bits, where x is an integer greater than zero), by exchanging partial results between the n small lower precision x-bits units (see arrows 140). The system 100 can be utilized for arithmetic multiply operations and/or multiply-add operations (i.e., these operations with a multiply differentiates the system 100 from a simple carry propagation between the SIMD units).

For example, the SIMD units 120.0 ... 120.n–1 are reconfigurable to compute multiple multiplications of x-bits wide numbers and add 2*x-bits results together to produce the combined result. The combined result can be a single wide complex scalar result with a higher precision or can be a portion of the single wide complex scalar result whit a higher precision. Note that the combination of the SIMD unit 120.0 ... 120.n–1 enables the computation of the wide result in parallel (i.e., not sequentially).

Further, each SIMD unit 120.0 ... 120.n–1 is reconfigurable to add to the combined result a 2*x-bits accumulator result. In accordance with a non-limiting embodiment, a group of four SIMD units can provide execution of four single, two double, or one quad precision complex arithmetic operation comprising but not limited to a multiply operation.

For instance, the SIMD units 120 of the system 100 can comprise x bit units that receive (see arrows 141) n x-bit input operands or n*x-bit input operands (represented by block 150). The complex arithmetic operation is performed by the SIMD units 120 on these operands.

During the complex arithmetic operation, each of the SIMD units 120 exchanges the partial results (see arrows 140). In a non-limiting embodiment, when n is equal to two, one of the SIMD units 120 (e.g., SIMD unit 120.0) can perform a high order portion of the complex arithmetic operation that produces a first intermediate result and the other of the SIMD units 120 (e.g., SIMD unit 120.1) can perform a low order portion of the complex arithmetic operation that produces a second intermediate result.

The partial results are utilized to compute each respective portion of a final result 160, which can be an n*x-bit scalar result (see arrows 151). Continuing with the non-limiting embodiment, the SIMD unit 120.0 can utilize part of the intermediate result from the SIMD unit 120.1 to produce a high order portion of the final result 160. The SIMD unit 120.1 can utilize part of the intermediate result from the SIMD unit 120.0 to produce a low order portion of the final result 160. The low and high order portions are then concatenated (combined) to produce the final result 160.

Figure 2:
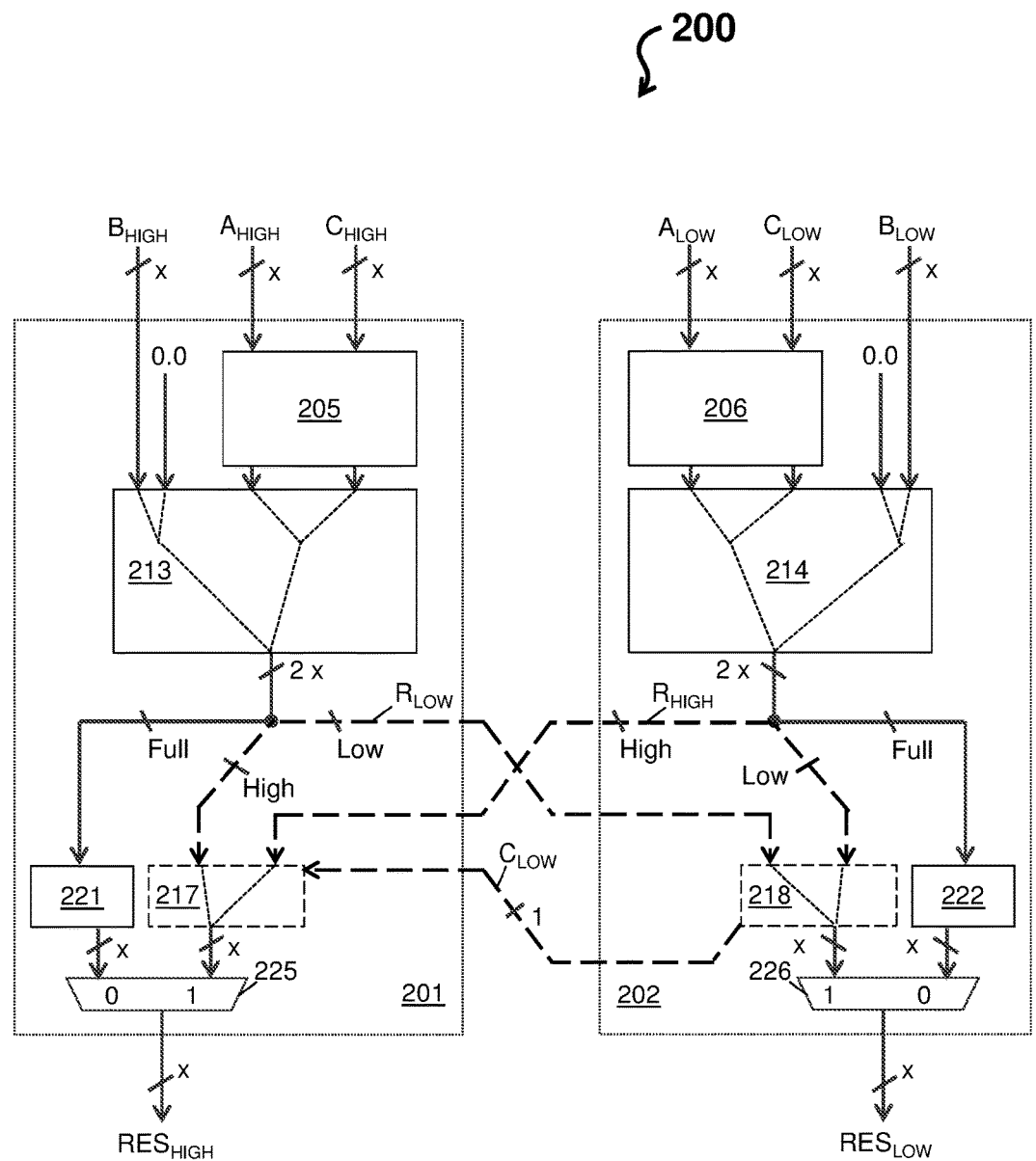
FIG. 2 depicts an implementation example of a system in accordance with one or more embodiments.

Turning now to FIG. 2, an implementation example of the system 100 is depicted in accordance with one or more embodiments. The implementation example is shown as a system 200, comprising a first arithmetic unit 201 and a second arithmetic unit 202 (e.g., binary floating point arithmetic units), each of which comprises a multiply-add arithmetic circuit. Each of the multiply-add arithmetic circuits of the first and second arithmetic units 201 and 202 respectively comprises multipliers 205 and 206 (e.g., sum and carry multipliers), first adders 213 and 214 (e.g., incorporating adders), second adders 217 and 218, formatters 221 and 222 (e.g., normalizer or rounders), and multiplexers 225 and 226.

Figure 3:
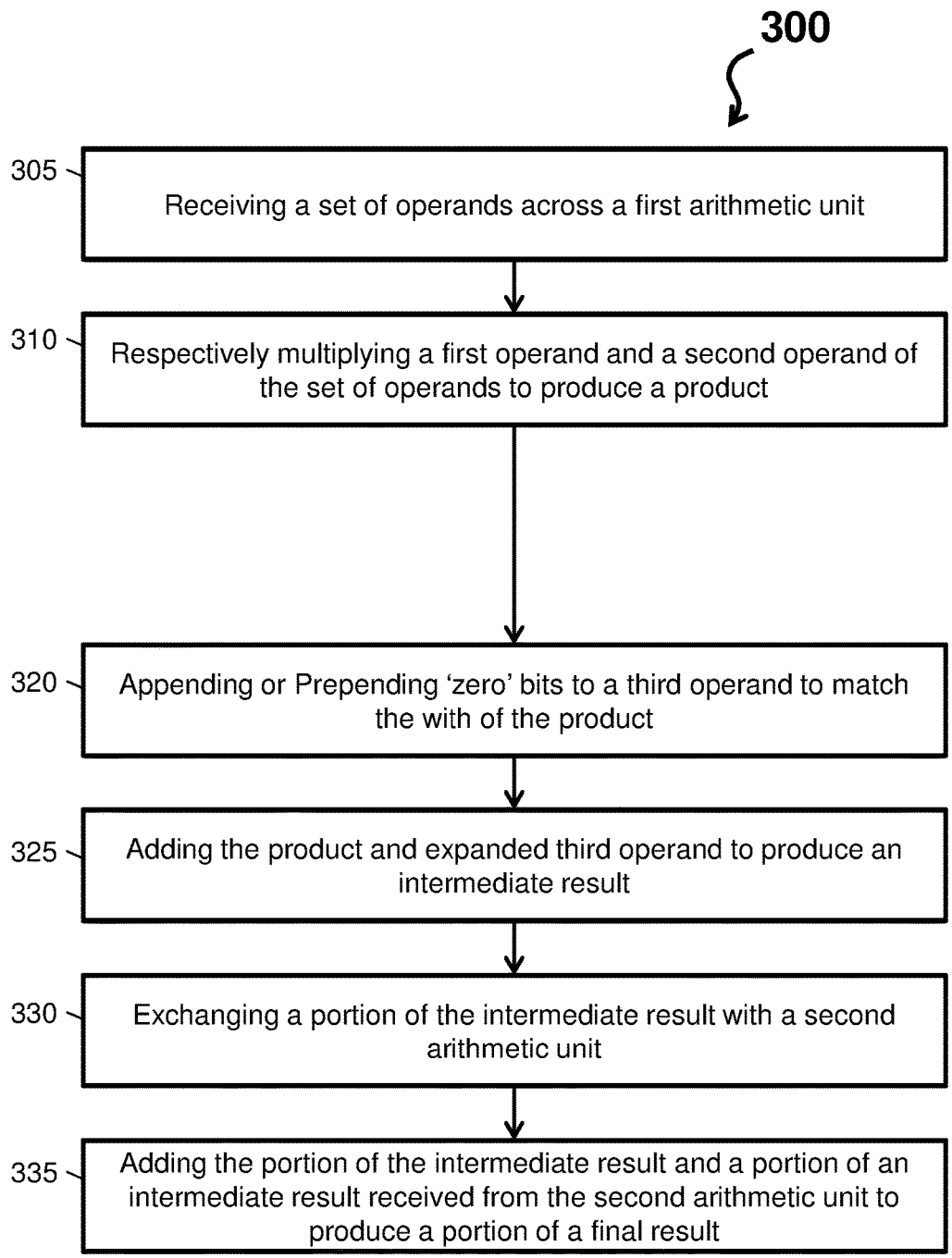
FIG. 3 depicts a process flow of system in accordance with one or more embodiments.

An operation of the system 200 is now described in accordance with a non-limiting embodiment with respect to a process flow 300 of FIG. 3. Note that while the process flow 300 describes operations from the perspective of the first arithmetic unit 201, similar operations occur in parallel at the second arithmetic unit 202.

In general, each of the data element low precision arithmetic blocks (e.g., arithmetic units 201 and 202) is a low precision arithmetic block, computing a result on one of the data elements of the SIMD (multiple data element instruction). Intermediate results from these data element low precision arithmetic blocks (e.g., arithmetic units 201 and 202) are exchanged and combined to compute a high precision data result.

The process flow 300 begins at block 305, where the system 200 receives a set of operands across the first arithmetic unit 201. The set of operands can include at least three operands A, B, and C. In this example, the first arithmetic unit 201 manages the high order bits of these three operands A, B, and C. As shown in FIG. 2, $A_{HIGH}$, $B_{HIGH}$, and $C_{HIGH}$ are received by the first arithmetic unit 201. Note that, in a non-limiting embodiment, if each operand A, B, and C is 2x bits (e.g., 128 bits), then the high order bits are split evenly to x bits (e.g., 64 bits). At block 310, the multiplier 205 of the system 200 respectively multiplies a first operand (e.g., $A_{HIGH}$) and a second operand (e.g., $C_{HIGH}$) of the set of operands to produce a product. As shown in FIG. 2, the multiplier 205 multiplies $A_{HIGH}$ and $C_{HIGH}$, which renders a first 2x-bit product (e.g., 128-bit product) and a second 2x-bit product.

Note that, in a non-limiting embodiment, the system 200 can add the product (e.g., the first and second 2x bit products) to produce a sum. At block 320, the system 200 appends 'zero' bits to a third operand (e.g., $B_{HIGH}$) of the set of operands to a third operand to match the width of the product (and produce an expanded third operand). Note that the appending operation produces a 2x-bit number for the second sum and the appending operation can occur within the first adder 213 (e.g., three inputs and outputting adder). For instance, as shown in FIG. 2, the first adder 213 adds the first and second 2x-bit products to create a first 2x-bit sum and the first adder 213 adds the $B_{HIGH}$ and 'zero' bits to create a second 2x-bit sum.

At block 325, the system 200 adds the product and the expended third operand to produce an intermediate result. Note that the intermediate result can be a 2x-bit number. At block 330, the system 200 exchanges a portion of the intermediate result with a second arithmetic unit 202. For instance, as shown in FIG. 2, the second adder 213 adds the first and second 2x-bit sums to create an intermediate result. A portion of the intermediate result from the second adder 213 is provided to the second arithmetic unit 202. Additionally, a portion of an intermediate result from the second adder 214 is provided to the first arithmetic unit 201. In this way, portions of each intermediate result are exchanged. Note that FIG. 2 depicts the lower x bits (e.g., 64 L; $R_{Low}$) of the intermediate result from the first binary floating point unit 201 being exchanged with the higher x bits (e.g., 64 H; $R_{HIGH}$) of the intermediate result from the second binary floating point unit 202. In this way, part results (e.g., $R_{HIGH}$ and $R_{Low}$) are utilized to compute wide results for multiplication and/or multiplication-addition.

At block 335, the system 200 adds the portion of the intermediate result and a portion of an intermediate result received from the second arithmetic unit to produce a portion of a final result. As shown in FIG. 2, the second adder 217 adds the higher 64 bits (e.g., 64 H) of the intermediate result from the first binary floating point unit 201 and the higher 64 bits (e.g., 64 H; $R_{HIGH}$) of the intermediate result from the second binary floating point unit 202 to a final result. The second adder 217 can also utilize a carry bit (e.g., $C_{LOW}$) from the second adder 218. The final result is then multiplexed, by the multiplexer 225, with a normalized intermediate result outputted from the formatter 221 to produce the high order bits of the final result (e.g., $RES_{HIGH}$). As noted above, similar operations are occurring in parallel at the second arithmetic unit 202 produce low order bits of the final result (e.g., $RES_{Low}$).

Figure 4:
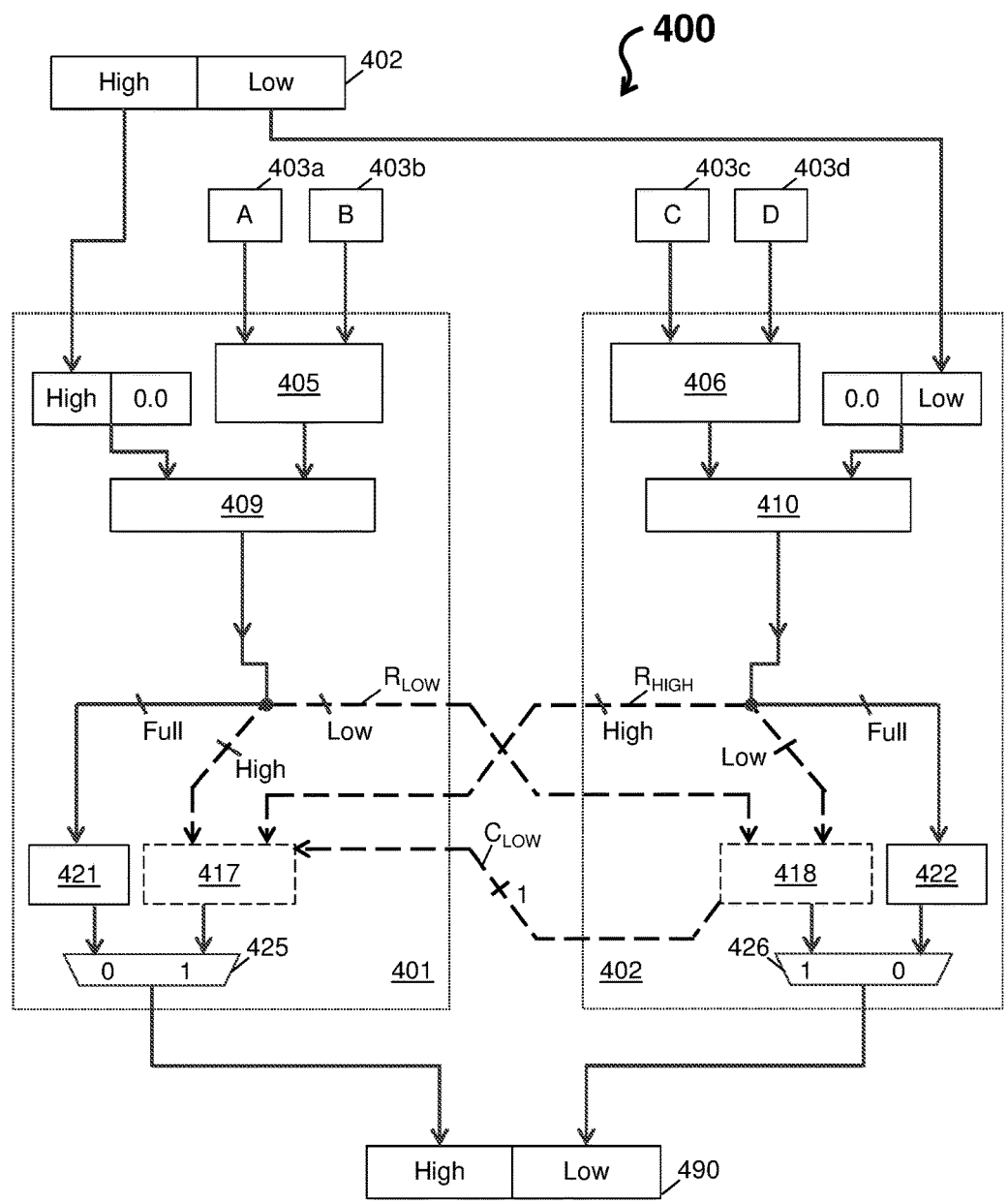
FIG. 4 depicts an implementation example of a system in accordance with one or more embodiments.

Turning now to FIG. 4, an implementation example of the system 100 is depicted in accordance with one or more embodiments. The implementation example is shown as a system 400, comprising a first arithmetic unit 401 and a second arithmetic unit 402 (e.g., binary floating point units). Each of the first and second arithmetic units 401 and 402 respectively comprise multipliers 405 and 406, first adders 409 and 410, second adders 409 and 410, formatters 421 and 422, and multiplexers 425 and 426.

In an exemplary operation, the system 400 receives a set of operands across the first arithmetic unit 401 and the second arithmetic unit 402. The set of operands can include a number 402, along with an operand A 403a, operand B 403b, operand C 403c, and operand D 403d. In this example, the first arithmetic unit 401 manages the high order bits of the number 402 and the second arithmetic unit 402 manages the low order bits of the number 402.

As shown in FIG. 4, the operand A 403a and the operand B 403b by the multiplier 405 of the system 400, which multiplies these operands to produce a first product. The operand C 403c and the operand D 403d by the multiplier 406 of the system 400, which multiplies these operands to produce a second product.

The system 400 adds the first product to produce a first sum resulting from the high order bits of the number 402 being appended by 'zero' bits. Further, the system 400 adds the second product to produce a second sum resulting from the low order bits of the number 402 being prepended by 'zero' bits.

The system 400 utilizes the first adder 409 to add the first sum and the first product to produce a first intermediate result. The system 400 utilizes the first adder 410 to add the second sum and the second product to produce a second intermediate result. Each of the first and second intermediate results are divided, such that parts of the first and second intermediate results are exchanged and supplied to the second adders 417 and 418. For instance, a low portion of the first intermediate result can be provided to the second binary floating point unit 402, while a high portion of the first intermediate result can be provided to the second adder 417. A high portion of the second intermediate result can be provided to the first binary floating point unit 401, while a low portion of the second intermediate result can be provided to the second adder 418. Note that each of the first and second intermediate results can be provided in full to the formatters 421 and 422.

The second adder 418 adds the low portion of the first intermediate result and the low portion of the second intermediate result to produce the low part of the final result. The second final result is then multiplexed, by the multiplexer 426, with a normalized intermediate result outputted from the formatter 421 to produce the low order bits of the combined result 490. The second adder 417 adds the high portion of the first intermediate result, the carry bit of the second intermediate result and the high portion of the second intermediate result to produce the high part of the final result. The first final result is then multiplexed, by the multiplexer 425, with a normalized intermediate result outputted from the formatter 421 to produce the high order bits of a combined result 490.

Figure 5:
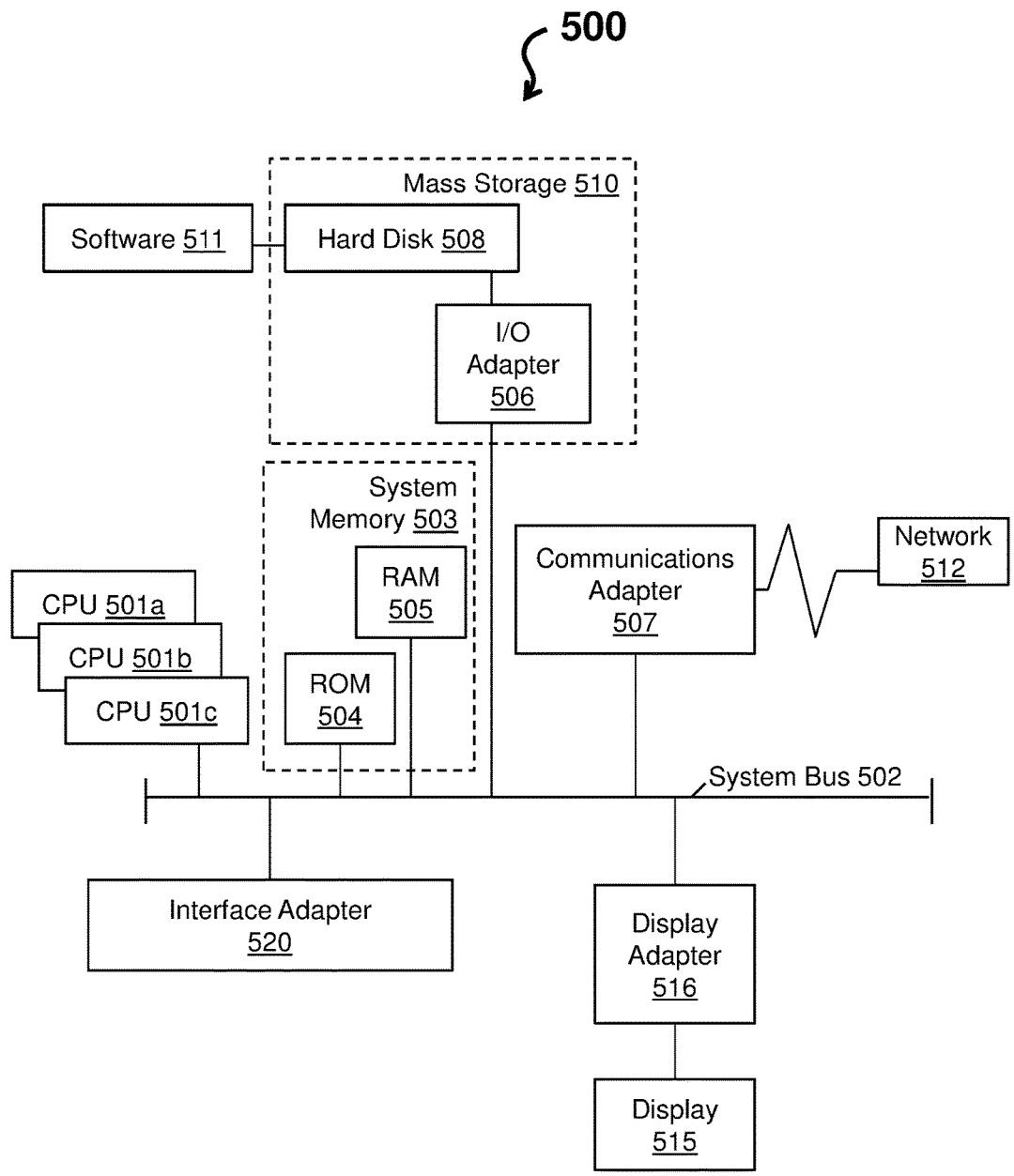
FIG. 5 depicts a system in accordance with one or more embodiments.

FIG. 5 depicts an example of a system 500 in accordance with one or more embodiments. The system 500 has one or more central processing units (CPU(s)) 501a, 501b, 501c, etc. (collectively or generically referred to as processor(s) 501). The processors 501, also referred to as processing circuits, are coupled via a system bus 502 to system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the system 500. The RAM is read-write memory coupled to the system bus 502 for use by the processors 501.

FIG. 5 further depicts an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510. A software 511 for execution on the system 500 may be stored in the mass storage 510. The mass storage 510 is an example of a tangible storage medium readable by the processors 501, where the software 511 is stored as instructions for execution by the processors 501 to cause the system 500 to operate, such as is described herein with reference to FIG. 3. Examples of computer program product and the execution of such instruction is discussed herein in more detail. Referring again to FIG. 5, a communications adapter 507 interconnects the system bus 502 with a network 512, which may be an outside network, enabling the system 500 to communicate with other such systems. A display (e.g., screen, a display monitor) 515 is connected to the system bus 502 by a display adapter 516, which may include a graphics controller to improve the performance of graphics intensive applications and a video controller. In one embodiment, the adapters 506, 507, and 516 may be connected to one or more I/O buses that are connected to the system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 502 via an interface adapter 520 and the display adapter 516. A keyboard, a mouse, a speaker, etc. can be interconnected to the system bus 502 via the interface adapter 520, which may include, for example, a Super I/O chip integrating multiple device adapters into a single integrated circuit.

Thus, as configured in FIG. 5, the system 500 includes processing capability in the form of the processors 501, and, storage capability including the system memory 503 and the mass storage 510, input means such as the keyboard and the mouse, and output capability including the speaker and the display 515. In one embodiment, a portion of the system memory 503 and the mass storage 510 collectively store an operating system, such as the z/OS or AIX operating system from IBM Corporation, to coordinate the functions of the various components shown in FIG. 5.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit comprising:
a plurality of reconfigurable units reconfigurable to compute a combined result,
wherein a first intermediate result of a first reconfigurable unit of the plurality of reconfigurable units is exchanged with a second intermediate result of a second reconfigurable unit of the plurality of reconfigurable units,
wherein the first reconfigurable unit of the plurality of reconfigurable units computes a first portion of the combined result utilizing the second intermediate result,
wherein the second reconfigurable unit of the plurality of reconfigurable units computes a second portion of the combined result utilizing the first intermediate result,
wherein the exchange of the first and second intermediate results comprises providing x-high-bits from the first reconfigurable unit and x-low-bits from the second reconfigurable unit, and
wherein a group of four reconfigurable units of the plurality of reconfigurable units provide execution of four single, two double, or one quad precision complex arithmetic operation comprising a multiply operation and an add operation.

2. The circuit of claim 1, wherein each reconfigurable unit is reconfigurable to compute an individual result.

3. The circuit of claim 1, wherein each reconfigurable unit comprises reconfigurable low precision arithmetic unit.

4. The circuit of claim 3, wherein each reconfigurable unit comprises a multiply-add arithmetic circuit.

5. The circuit of claim 4, wherein the multiply-add arithmetic circuit comprises a multiplier, a first adder, a formatter, and a second adder.

6. The circuit of claim 1, wherein the plurality of reconfigurable units is reconfigurable to compute multiple multiplication of x-bits numbers and add 2*x-bits results together to produce the combined result.

7. The circuit of claim 6, wherein each reconfigurable unit is reconfigurable to add to the combined result a 2*x-bits accumulator result.

8. The circuit of claim 1, wherein the exchange of the first and second intermediate results is in parallel.

9. The circuit of claim 1, wherein the combined result comprises a single wide complex scalar result or a portion of the single wide complex scalar result.

10. A system, comprising a processor and a memory, the processor comprising:
a plurality of reconfigurable units reconfigurable to compute a combined result,
wherein a first intermediate result of a first reconfigurable unit of the plurality of reconfigurable units is exchanged with a second intermediate result of a second reconfigurable unit of the plurality of reconfigurable units,
wherein the first reconfigurable unit of the plurality of reconfigurable units computes a first portion of the combined result utilizing the second intermediate result,
wherein the second reconfigurable unit of the plurality of reconfigurable units computes a second portion of the combined result utilizing the first intermediate result,
wherein the exchange of the first and second intermediate results comprises providing x-high-bits from the first reconfigurable unit and x-low-bits from the second reconfigurable unit, and
wherein a group of four reconfigurable units of the plurality of reconfigurable units provide execution of four single, two double, or one quad precision complex arithmetic operation comprising a multiply operation and an add operation.

11. The system of claim 10, wherein each reconfigurable unit is reconfigurable to compute an individual result.

12. The system of claim 11, wherein each reconfigurable unit comprises reconfigurable low precision arithmetic unit.

13. The system of claim 12, wherein each reconfigurable unit comprises a multiply add arithmetic circuit.

14. The system of claim 13, wherein the multiply add arithmetic circuit comprises a multiplier, a first adder, a formatter, and a second adder.

15. The system of claim 10, wherein the plurality of reconfigurable units is reconfigurable to compute multiple multiplication of x-bits numbers and add 2*x-bits results together to produce the combined result.

16. The system of claim 15, wherein each reconfigurable unit is reconfigurable to add to the combined result a 2*x-bits accumulator result.

17. A method implemented by a processor comprising a plurality of reconfigurable units reconfigurable to compute a combined result, the method comprising:
exchanging a first intermediate result of a first reconfigurable unit of the plurality of reconfigurable units reconfigurable with a second intermediate result of a second reconfigurable unit exchange of the plurality of reconfigurable units reconfigurable;
computing, by the first reconfigurable unit of the plurality of reconfigurable units, a first portion of the combined result utilizing the second intermediate result; and
computing, by the second reconfigurable unit of the plurality of reconfigurable units, a second portion of the combined result utilizing the first intermediate result,
wherein the exchange of the first and second intermediate results comprises providing x-high-bits from the first reconfigurable unit and x-low-bits from the second reconfigurable unit, and
wherein a group of four reconfigurable units of the plurality of reconfigurable units provide execution of four single, two double, or one quad precision complex arithmetic operation comprising a multiply operation and an add operation.

18. The method of claim 17, wherein each reconfigurable unit is reconfigurable to compute an individual result.

19. The method of claim 18, wherein each reconfigurable unit comprises reconfigurable law precision arithmetic unit.

* * * * *